United States Patent
Smed

(10) Patent No.: US 6,758,454 B2
(45) Date of Patent: Jul. 6, 2004

(54) FLAT PANEL DISPLAY SYSTEM

(76) Inventor: Ole Falk Smed, 14135 E. 42nd. Ave., Unit 70, Denver, CO (US) 80239

( * ) Notice: Subject to any disclaimer, the term of this patent is extended or adjusted under 35 U.S.C. 154(b) by 0 days.

(21) Appl. No.: 10/611,566

(22) Filed: Jul. 1, 2003

(65) Prior Publication Data

US 2004/0031894 A1 Feb. 19, 2004

Related U.S. Application Data

(62) Division of application No. 10/222,138, filed on Aug. 15, 2002, now Pat. No. 6,695,270.

(51) Int. Cl.[7] .............................. A47F 5/00; A47B 96/06
(52) U.S. Cl. ..................... 248/314; 248/278.1; 248/917
(58) Field of Search ........................... 248/314, 222.12, 248/224.7, 220.21, 346.04, 297.21, 288.31, 917, 918, 279.1, 278.1

(56) References Cited

U.S. PATENT DOCUMENTS

| | | | |
|---|---|---|---|
| 1,002,783 A | | 9/1911 | Sweet |
| 4,082,244 A | | 4/1978 | Groff |
| 4,088,848 A | * | 5/1978 | Weed .......................... 248/314 |
| 4,166,602 A | | 9/1979 | Nilsen et al. |
| 4,726,552 A | | 2/1988 | Warshawsky |
| 4,836,486 A | | 6/1989 | Vossoughi et al. |
| 5,026,016 A | * | 6/1991 | Lisowski ..................... 248/314 |
| 5,342,137 A | | 8/1994 | Peng |
| 5,379,205 A | | 1/1995 | Peng |
| 5,584,105 A | * | 12/1996 | Krauss ......................... 24/614 |
| 5,820,287 A | | 10/1998 | Bartlett et al. |
| 5,842,672 A | | 12/1998 | Sweere et al. |
| 5,850,954 A | * | 12/1998 | Dong-Joo ................... 224/197 |
| 6,076,785 A | | 6/2000 | Oddsen, Jr. |
| 6,254,302 B1 | * | 7/2001 | Kraus .......................... 403/326 |
| 6,283,428 B1 | | 9/2001 | Maples et al. |
| 6,400,560 B1 | * | 6/2002 | Chian .......................... 361/681 |
| 6,409,134 B1 | | 6/2002 | Oddsen, Jr. |
| 6,409,475 B1 | * | 6/2002 | Ho ................................ 416/63 |
| 6,435,617 B1 | * | 8/2002 | McNair ....................... 297/397 |
| 6,478,274 B1 | | 11/2002 | Oddsen, Jr. |
| 6,554,238 B1 | | 4/2003 | Hibberd |
| 6,695,270 B1 | * | 2/2004 | Smed ....................... 248/278.1 |
| 6,702,604 B1 | * | 3/2004 | Moscovitch ................ 439/374 |
| 2001/0045497 A1 | | 11/2001 | Coonan et al. |
| 2002/0011544 A1 | | 1/2002 | Bosson |

FOREIGN PATENT DOCUMENTS

| | | | |
|---|---|---|---|
| EP | 1139003 | * | 4/2001 |
| WO | WO 01/35796 | * | 5/2001 |

* cited by examiner

Primary Examiner—Leslie A. Braun
Assistant Examiner—Tan Le
(74) Attorney, Agent, or Firm—J. Herbert O'Toole; Nexsen Pruet, LLC

(57) ABSTRACT

A modular display system for display devices, especially flat screen monitors which is a hub and spoke design whereby multiple motors are mounted at the same hub height. The display system has means for locking the height of each display device using a cam and brake concept adjusted using a jackscrew. For quick change-out of display devices, a bayonet mount is used to attach the display device to the spokes.

3 Claims, 12 Drawing Sheets

FLAT PANEL DISPLAY SYSTEM

This application is a Divisional of Ser. No. 10/222,138, filed on Aug. 15, 2002 now U.S. Pat. No. 6,695,270.

BACKGROUND OF THE INVENTION

1. Field of the Invention

This invention relates to systems for supporting one or more display panels. More particularly, the support system provides a means for supporting multiple displays such as flat screen liquid crystal display devices and enables their adjustment so as to maintain the screens in a common visual plane. The invention particularly relates to a modular hub and spoke system which provides easy alignment, greater range of adjustment, and which has, therefore, multiple uses.

2. Background and Prior Art

Computerized workstations can provide very large amounts of information provided that there is adequate display surface area. Banks of cathode ray tube monitors characterize a variety of work stations, including industrial control rooms, television broadcast studios and securities brokerages. The evolution of flat screen liquid crystal displays (LCD) has greatly reduced the size of monitors as well as decreased their weight and heat loading. The improved flexibility available for work station design requires methods for mounting multiple flat screens so that they are equally readable from the same viewing location (i.e. in the same focal plane) and adjustable for different users.

U.S. Patent publication 2002/0011544A1 discloses a quick-release system for replacing failed display monitors. U.S. Patent publication 2001/0045497A1 discloses an adjustable computer work station using multiple arms to raise and lower and adjust the angle of a display screen and a keyboard. U.S. Pat. No. 5,842,672 discloses a multi-jointed and pivoted support system for a flat panel video display. U.S. Pat. No. 5,820,287 discloses an articulated conduit joint involving two arms and a clutched joint to maintain adjusted location.

Systems for mounting multiple LCD panels heretofore have mounted panels on a separate support, have ganged panels on a common support bar or brace or have articulated each panel from a different point on a horizontal or vertical support. The result is that there is either limited range of movement for adjusting each panel or that each panel has a different range of motion.

BRIEF DESCRIPTION OF THE INVENTION

It is an object of this invention to provide a system for supporting displaying devices, especially flat screen LCD monitors which provides equivalent ranges of motion for each set of screens. It is a further objective of this invention to provide a system for supporting flat screen LCD monitors, which can be aligned to provide substantially equivalent focal points or focal planes. It is a further object of this invention to provide a modular mounting system which is adaptable to multiple screens using a single mounting system and a single mounting point on a desk or other support structure.

DETAILED DESCRIPTION OF THE INVENTION

Figure 1:
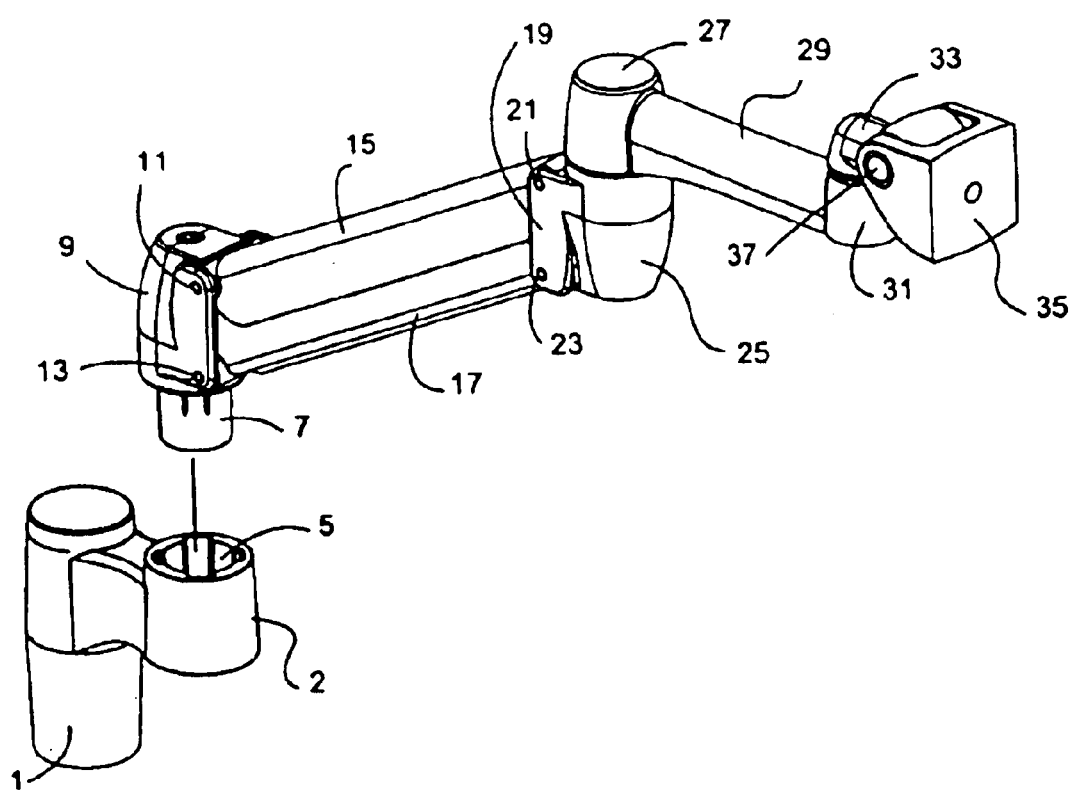
FIG. 1 is a partial sectional view of a hub and a single spoke.

The invention is a hub and spoke design for a mounting system to display one or more display devices, especially flat screen LCD monitors. More particularly, the invention enables the display of multiple monitors in a collage format for rapid viewing of multiple sets of information. The invention is characterized by being quickly adjustable but subsequently easily locked into position. In additional, repairs may be made quickly by rapid change-out of screens. The invention will describe in terms of the illustrated embodiments shown in the drawings.

FIG. 1 shows a partial sectional view of the components of this invention. Hub 1, which for illustrative purposes is shown as a vertical tube, which is firmly mounted at one end (the base, not shown) to a desk, table, wall, furniture panel or accessory hanging system, supports a socket assembly arm 2. The socket or bore 5 receives a pivot post 7 which carries a swivel turret 9 with hinging means such as hinge pins 11 and 13. A radius arm 15 and a control arm 17 are carried on the hinge pins and connect to a second hinge bracket 19 with respective hinge pins 21 and 23 to form a parallelogram. A gas or coil steel spring (not shown because it is internal to arm 15) connects swivel turret to the arm 15 to stabilize the position of bracket 19. Bracket 19 carries a connector 25 which is illustrated as a post-type connector. Internal to 25 is a brake system shown in FIG. 5. A swivel turret 27 attaches to the post and has a fixed length arm 29 extending therefrom. The arm terminates in a swivel or socket 31 to which a short swivel arm 33 is rotatably attached. The swivel arm is parallel to said fixed length arm 29. The swivel arm terminates in a mounting bracket 35 which is adjustable about hinge pin 37. The screen is attached to bracket 35 using a system shown in FIGS. 10–12.

Figure 2:
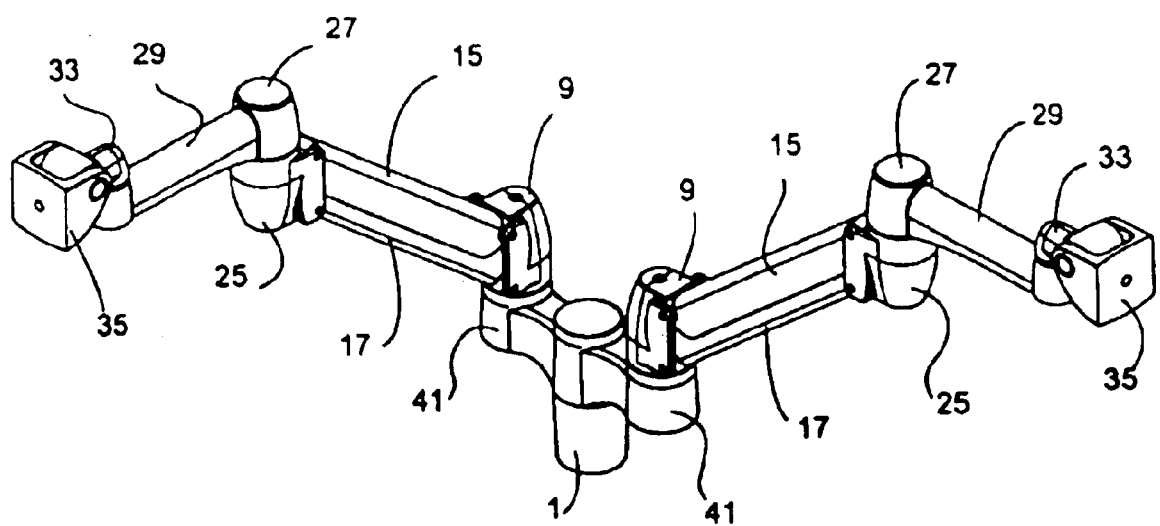
FIG. 2 is an assembled duplex mounting system.

FIG. 2 shows a duplex mounting arrangement wherein socket assembly arm 3 has been replaced with a duplex assembly 41 which carries two sockets and supports two arms, each articulated assembly being carried at the same level on the hub 1.

Figure 3:
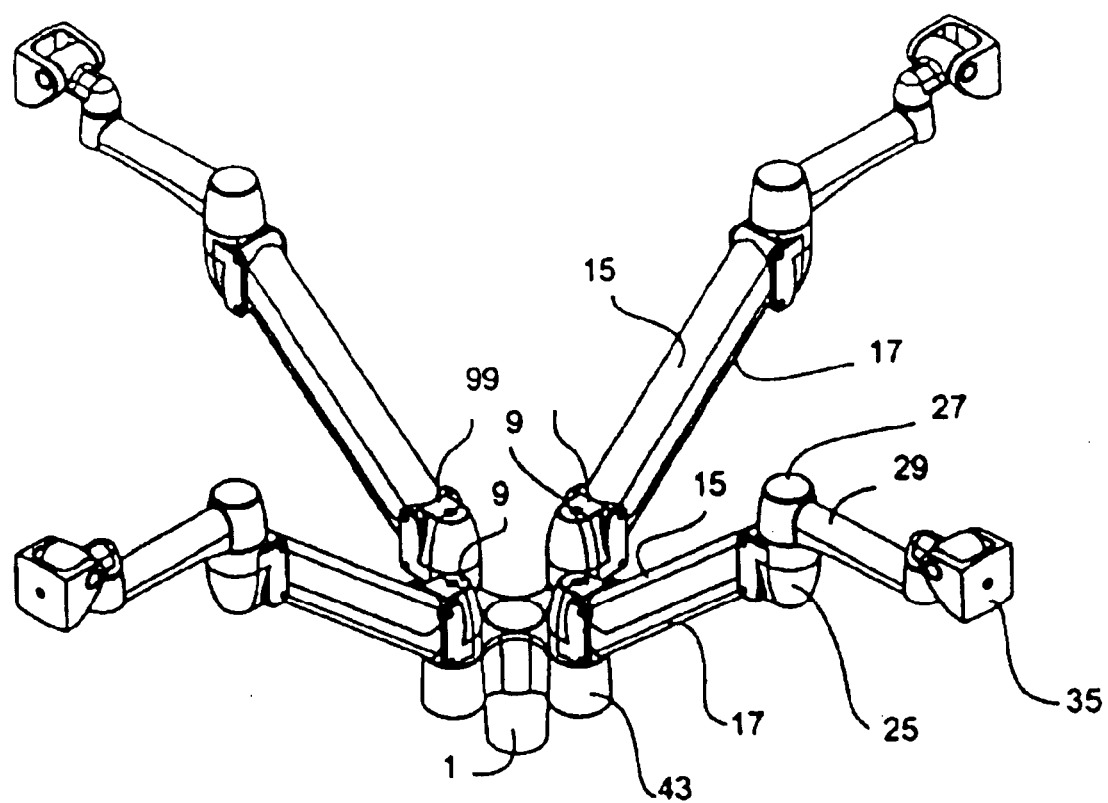
FIG. 3 is an assembled quad assembly arrangement.

FIG. 3 shows a quad socket assembly wherein a section 43 having four sockets is attached to the hub 1, the numbers for each element being those described supra.

Figure 4:
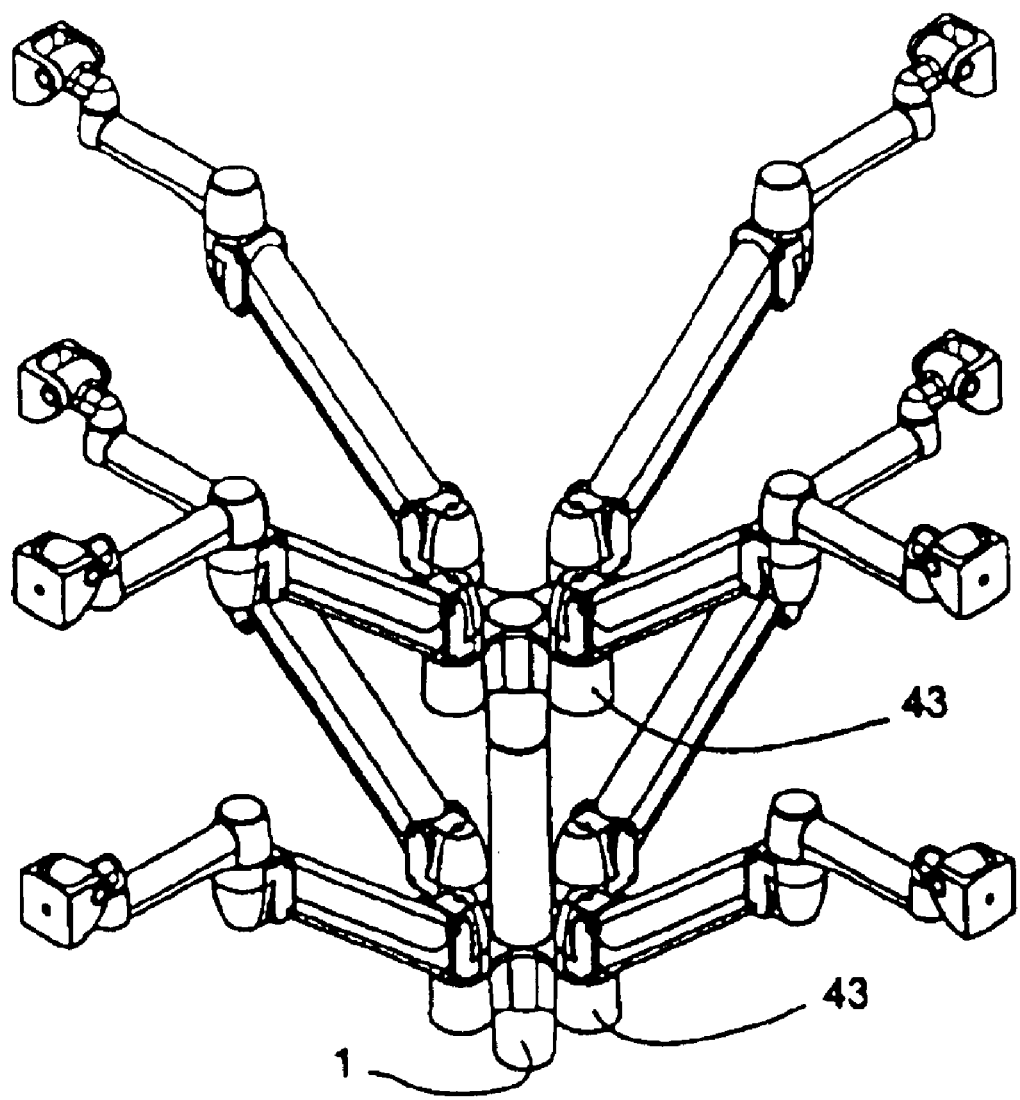
FIG. 4 is a stacked quad assembly arrangement.

FIG. 4 shows an assembly having two quad sockets mounted on the same hub structure. Again, the numbers for each element are those described supra.

Although the invention has been illustrated in terms of a tubular hub, square tubing or channel sections are equally usable. Likewise, a horizontal brace could be used for the hub and the sockets turned 90° compared to that illustrated in FIGS. 1 through 4.

Critical to the operation of the system is the ability to locate each screen in a desired position and to hold the screen in that position. It is conventional to counterbalance flat screen monitors and other devices which are adjustable vertically using parallel arms hinged at their ends and to suspend them using coiled or gas springs. The force exerted by the spring induces a lifting force on the parallelogram arm which is changed by altering the angle of the spring. It therefore follows, detachment of the screen from the arm would cause a change in height setting. When multiple screens are placed in close proximity, as in trading and monitoring stations, and a quick change of screen is required, it is desirable the height setting of the screen mount remain constant. For this reason we have devised a method to lock each screen at the desired height setting.

Figure 5:
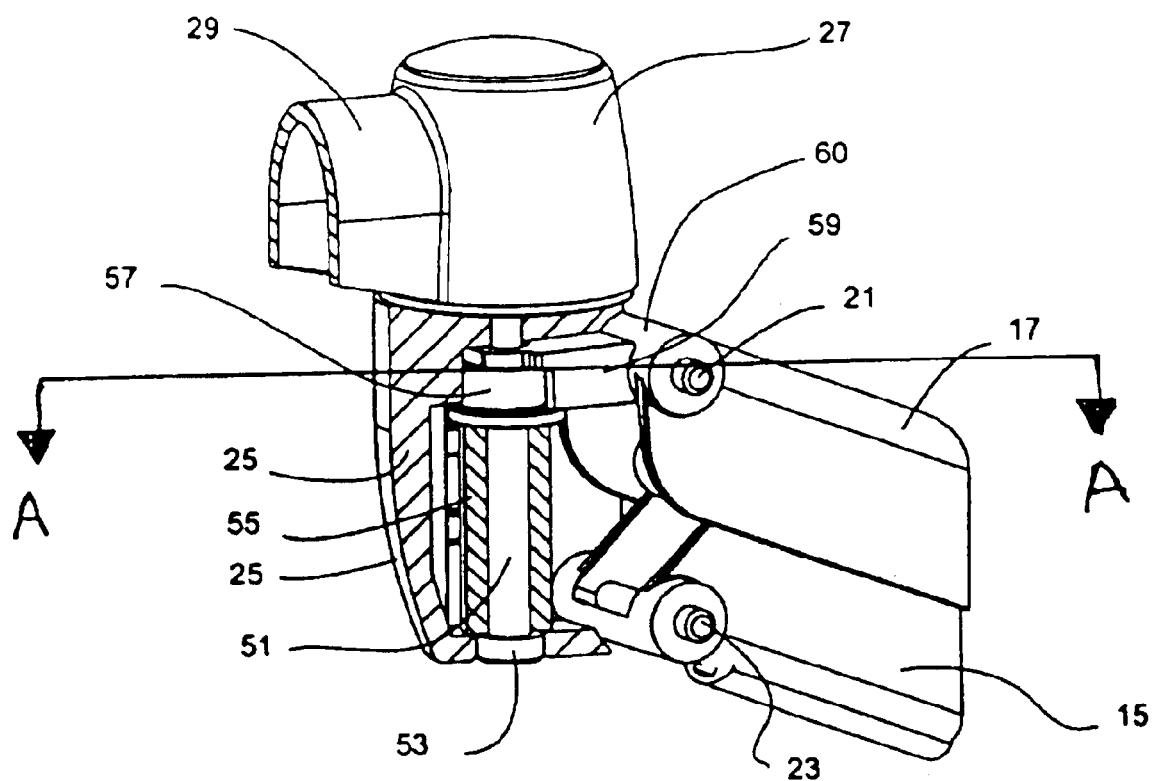
FIG. 5 is a cut-away showing the brake assembly for locking the height setting.

FIG. 5 shows the locking mechanism in a cut-away. Radius arm 15 and control arm 17 are the long parallel arms of the parallelogram. The bracket 19 and connector housing 25 have been partially cut away to reveal the location of hinge pins 21, 23. A jackscrew 51 is retained by an unthreaded spacer sleeve 55. At the top of the jackscrew is carried a cam 57 which is thread locked onto screw 51. The lock of the cam presses against a brake shoe 59 forcing it into axle housing 60 molded into the end of arm 17.

Figure 6:
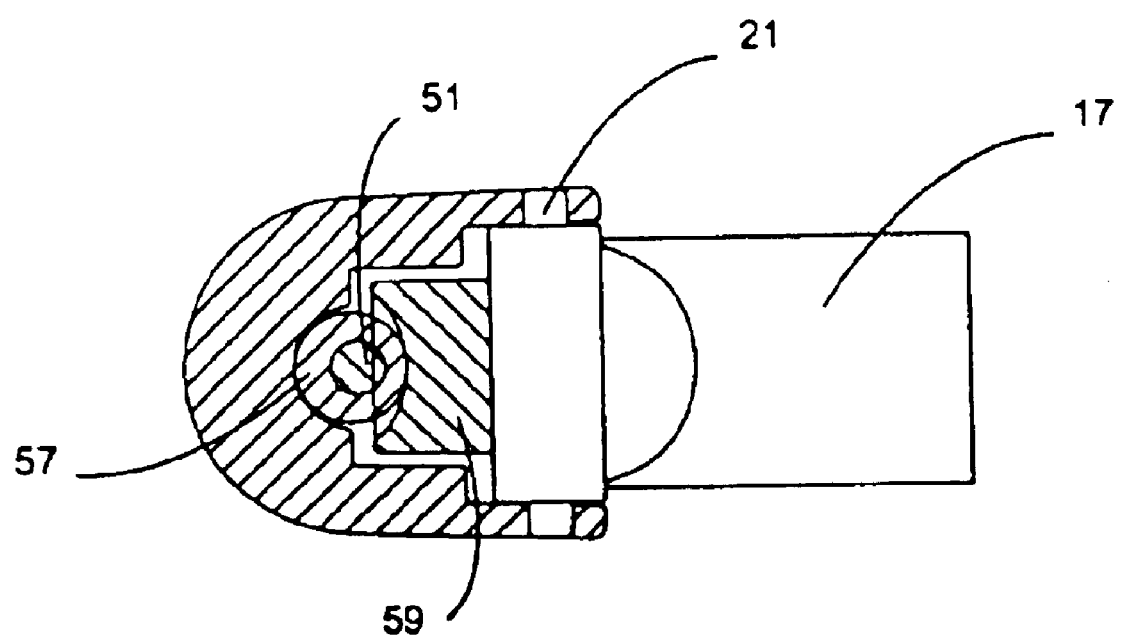
FIG. 6 is a section of FIG. 5 along line A—A.

FIG. 6 shows the relationship of the components along line A—A.

Figure 7:
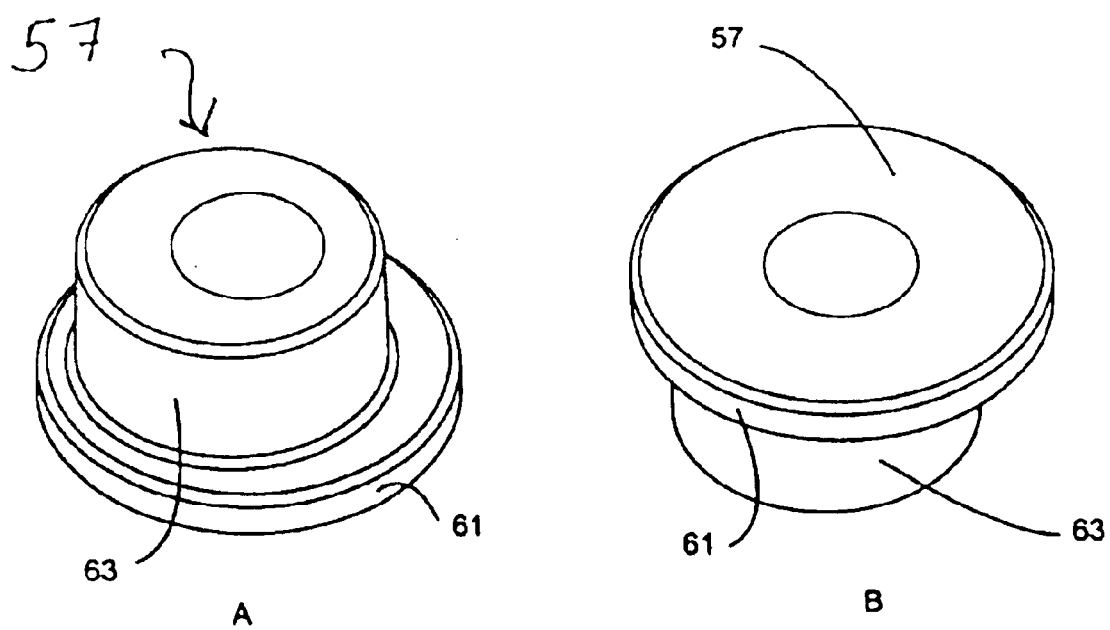
FIGS. 7A and 7B are a plan and elevational view, respectively, of the brake cam of the locking device.

FIG. 7A is a plan view of cam 57. A circular base rests on the sleeve 51. An eccentric lock 63 projects upwardly, as shown in side elevation FIG. 7B. The lock contacts the brake shoe 59.

Figure 8:
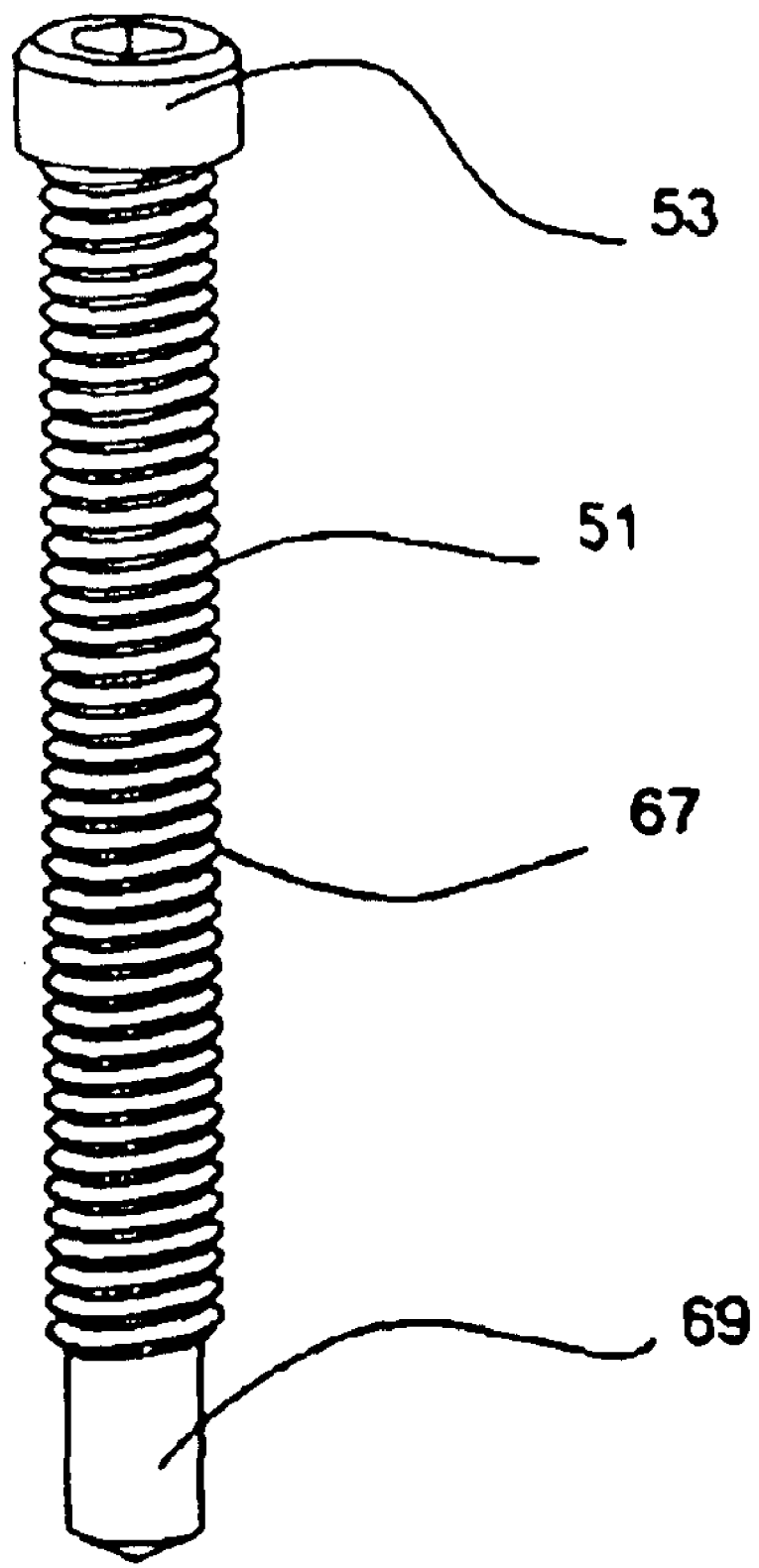
FIG. 8 is a side view of the jack screw of the locking system.

The jackscrew is shown in FIG. 8. Screw 51 has a head 53 which provides a point of engagement. The head may include a lever or thumb screw (not shown) but the preferred method employs a hex key wrench engaging in a hex head. The screw which ends in an unthreaded end 69, carries threads over most of its length.

Figure 9:
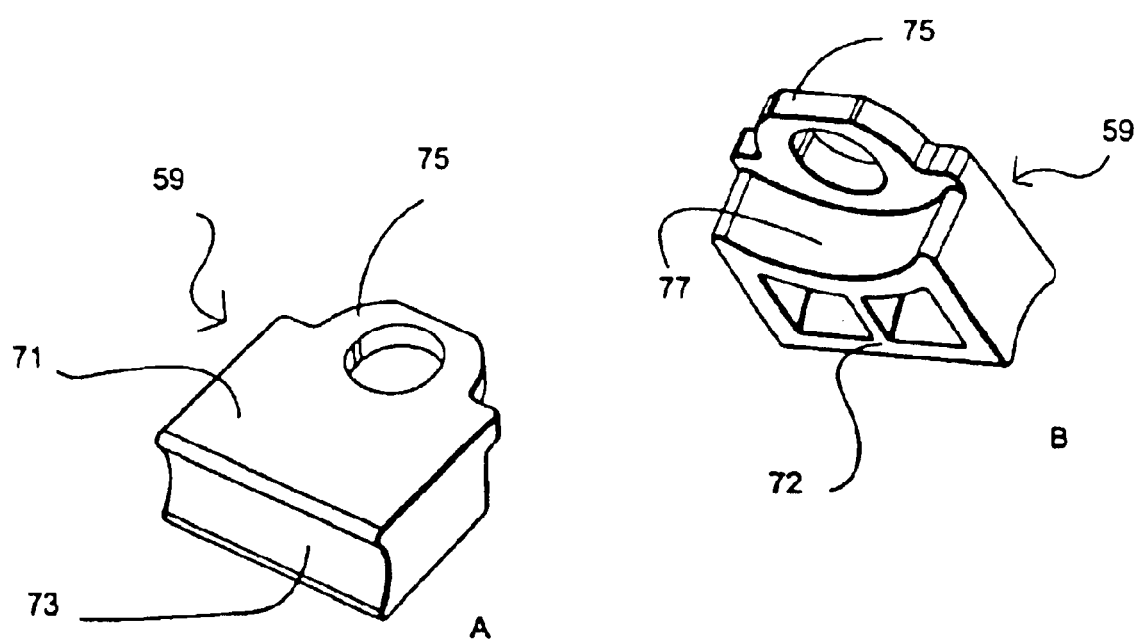
FIGS. 9A and 9B are perspective views of the brake shoe of the locking device.

The brake shoe 59 is shown in top perspective in FIG. 9A and in bottom perspective in FIG. 9B. The brake shoe has a top surface 71, a bottom surface 72. On the side facing the hinge pin, a curved contact surface 73 is formed to engage the housing 60. On the side facing the cam, a cam follower face engages the cam lobe 63. Locating fork 75 rests on the top of the cam lobe and surrounds the unthreaded end of screw 51 to align the brake with the cam and hinge.

In operation, when the screen height has been set, the jackscrew is turned to urge the cam into the brake which presses against the housing 60 around hinge pin 21 to release the lock mechanism. To release, it is required only to back the jackscrew off less than half of a turn.

Figure 10:
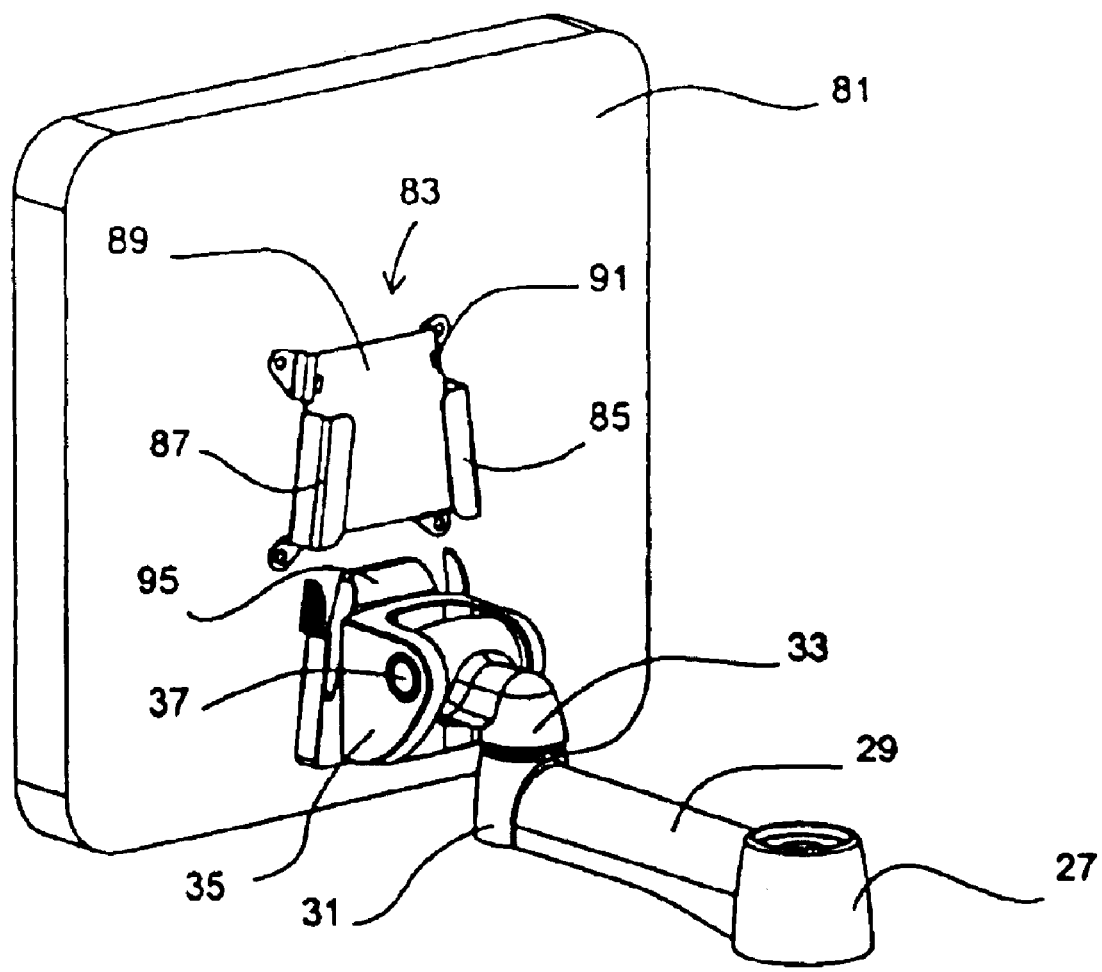
FIG. 10 is a perspective view of the quick change mounting system.

Rapid screen changes are available due to the quick change mounting system. The concept is shown in FIG. 10. Flat screen 81 has threaded receptacles 83 to which the trapezoidal surface plate 89 attaches with machine screws or equivalent fastening means.

Figure 11:
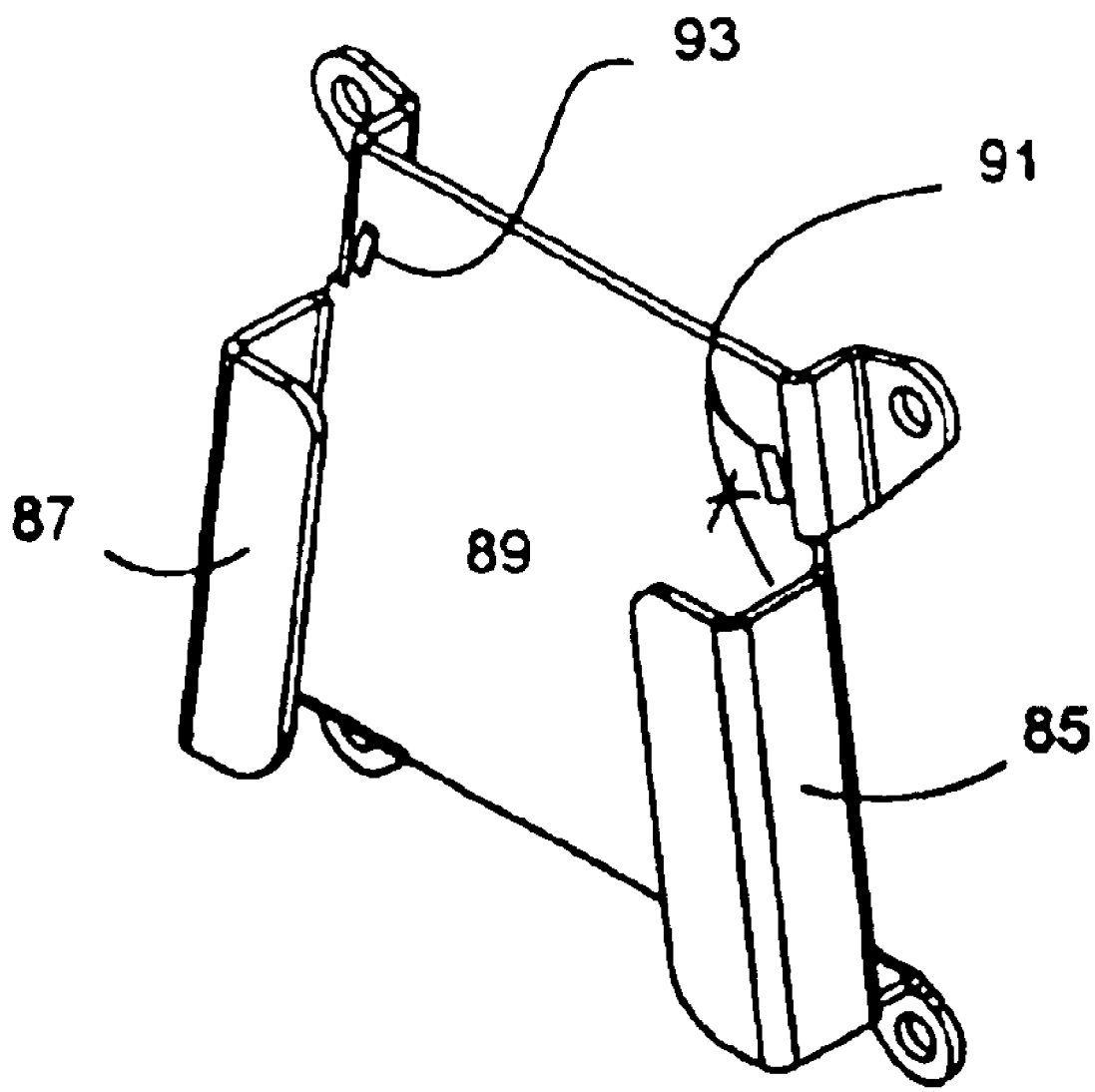
FIG. 11 is a perspective view of the monitor mounting bracket.
Figure 12:
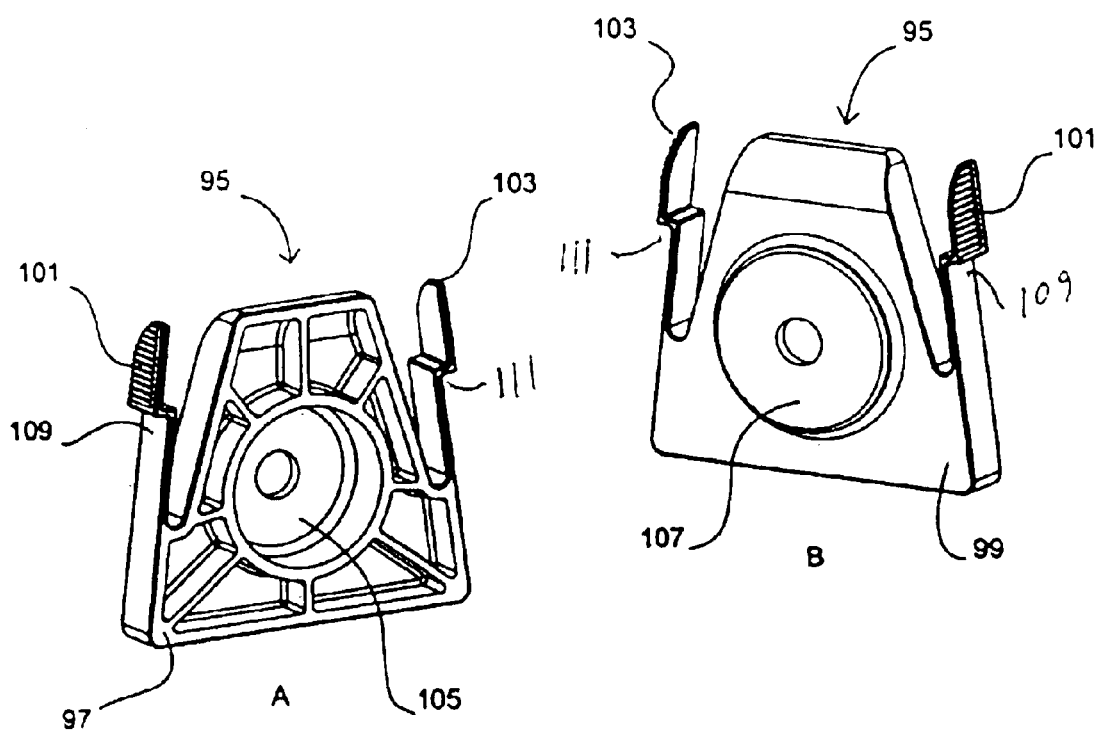
FIGS. 12A and 12B are a perspective view of the quick change swivel plate.

As shown in FIG. 11, each side of the surface plate are channels 85, 87 disposed at an angle to the vertical such that the distance between the channels is greater at the base of the surface plate than at the top of the channels. At or near the top of each channel and disposed inwardly of the channel are protuberance 91, 93 from the surface plate. The protuberance needs only be a small fraction of the depth of the channels. Their function will be discussed below.

The swivel plate 95 is illustrated in FIGS. 12A and 12B. Obverse face 97 has cantilevered locking tabs 101, 103 projecting vertically on each side. The plate is trapezoidally shaped to conform to the surface of plate 87 with the tabs 101, 103 sized to fit into channels 85, 87 respectively. The tabs are flexible over about one half of their upper portion. Countersunk area 105 allows a fastener to be used to secure the plate to bracket 35 without the fastener projecting past the surface of the face 97. FIG. 12B shows the reverse face 99. A pedestal area 107 conforms to the shape of countersunk area 105 and allows for a space between face 99 and bracket 35.

Reverting to FIG. 10, it may be seen that the screen is lowered so that the swivel plate 95 slide into bracket 83. Tabs 101, 103 fit into channels 85, 87. When the tabs and channel fully conform, the ends of the tabs project slightly above the channels. When present, notches 109, 111 resist withdrawing the swivel plate from the mounting bracket. To effect removal, the tabs are drawn together, sliding across aforementioned protuberances 91, 93 so as to hold the ends of the tabs away from contact with the top of the channels. The screen can then be lifted off of the mount and a new screen installed in two motions. With the tabs held inwardly by the protuberances, both hands may be used to hold and manipulate the screen.

Industrial Applicability

The structures of this invention are useful in the petrochemical industry for monitoring the condition of process equipment, in the distribution of products to determine, for example, availability status, in the transportation industry for viewing shipping information, departure schedules and service schedules, in the brokerage industry for displaying information relating to commodities and securities. The apparatus may also be used in the entertainment industry when a large picture is formed as a mosaic on a number of adjacent display screens.

Changes and departures in this invention may be made by those skilled in the art without departing from the spirit and scope thereof. Therefore the invention is not intended to be limited by the description and figures but are those as set forth in the following claims.

We claim:

1. A quick change system for detaching and attaching display devices to a mounting bracket comprising in combination:

a trapezoidal display device mount bracket attached to the back of a display device, said display device mount bracket having a pair of opposed channels at complimentary angles whereby bottoms of said channels are farther apart than the tops thereof;

a swivel plate mounted on said mounting bracket, said swivel plate spaced apart from a surface of said mounting bracket, said swivel plate being complimentary to said display device mount bracket and having locking tabs integrated with the sides of the swivel plate and being flexible over at least their top halves;

whereby the trapezoidal display device mount bracket may be slid over said complimentary swivel bracket and held in place by contact between said channels and said locking tabs.

2. A quick change system according to claim 1 further comprising notches at the top of said locking tabs which extend beyond walls of said channels to lock the channels and tabs in place.

3. A quick change system according to claim 2 further comprising a pair of protrusions on the face of said display device mount bracket which hold the locking tabs in place when the tabs are urged toward each other to release the bracket from the swivel bracket.

* * * * *